(12) United States Patent
Hollowed

(10) Patent No.: US 6,293,485 B1
(45) Date of Patent: Sep. 25, 2001

(54) TWO-STAGE RETRACTABLE CORD REEL

(75) Inventor: Edward J. Hollowed, Naperville, IL (US)

(73) Assignee: The Morey Corporation, Woodridge, IL (US)

(*) Notice: Subject to any disclaimer, the term of this patent is extended or adjusted under 35 U.S.C. 154(b) by 0 days.

(21) Appl. No.: 09/636,258

(22) Filed: Aug. 10, 2000

(51) Int. Cl.⁷ ................................................ B65H 75/48
(52) U.S. Cl. .................................. 242/385.3; 191/12.2 R
(58) Field of Search ............................. 242/385.3, 385.1, 242/385.2; 191/12.2 R, 12.4; 379/438

(56) References Cited

U.S. PATENT DOCUMENTS

| | | |
|---|---|---|
| 561,421 | 6/1896 | Minnis . |
| 821,753 | 5/1906 | Shimer . |
| 1,116,402 | 11/1914 | Ferguson . |
| 1,271,872 | 7/1918 | Eleyet . |
| 1,288,511 | 12/1918 | Clarke . |
| 1,782,191 | 11/1930 | Bolling . |
| 1,865,069 | 6/1932 | Allen . |
| 1,958,626 | 5/1934 | Krantz . |
| 2,031,434 * | 2/1936 | Stern et al. ......................... 242/385.1 |
| 2,206,352 | 7/1940 | Hellmann . |
| 2,391,840 | 12/1945 | Meletti . |
| 2,494,525 | 1/1950 | Steuart . |
| 2,678,779 | 5/1954 | Bellmer . |
| 3,490,715 | 1/1970 | Nicpon . |
| 3,590,656 * | 7/1971 | Lloyd .................................. 242/385.3 |
| 3,630,466 | 12/1971 | Kindermann . |
| 3,834,645 * | 9/1974 | Morishige .......................... 242/385.3 |
| 3,854,017 * | 12/1974 | Crim .................................. 242/385.1 |
| 3,858,826 * | 1/1975 | Sprecher ............................ 242/385.3 |
| 4,062,608 | 12/1977 | Peirce . |
| 4,108,395 * | 8/1978 | Heath ................................. 242/385.3 |
| 4,139,741 | 2/1979 | Kennedy . |
| 4,235,419 | 11/1980 | Schuck . |
| 4,241,938 * | 12/1980 | Patel et al. ......................... 242/385.3 |
| 4,384,688 | 5/1983 | Smith . |
| 4,467,979 | 8/1984 | Koehler . |
| 4,511,101 | 4/1985 | King . |
| 4,646,987 | 3/1987 | Peterson . |
| 4,727,569 | 2/1988 | Kutrieb et al. . |
| 4,757,955 | 7/1988 | Simmons . |
| 4,844,359 | 7/1989 | Kato . |
| 4,940,859 | 7/1990 | Peterson . |
| 4,946,010 | 8/1990 | DiBono . |
| 4,953,809 | 9/1990 | Barrus . |
| 4,989,805 | 2/1991 | Burke . |
| 5,094,396 | 3/1992 | Burke . |

(List continued on next page.)

FOREIGN PATENT DOCUMENTS 55-847753 * 6/1980 (JP) .................................. 242/385.1

OTHER PUBLICATIONS

Photograph of the "uni-Reel" retractable cord reel, the Morey corporation, Woodbridge, illinois, sold prior to 1998 by Morey.

*Primary Examiner*—John M. Jillions
(74) *Attorney, Agent, or Firm*—Leydig, Voit & Mayer, Ltd.

(57) ABSTRACT

A cord storage assembly is disclosed. A length of cord can be wound onto a reel. The storage assembly includes a retraction mechanism and a latch mechanism. A latch pilot mechanism is provided to selectively engage and disengage the latch mechanism. The latch pilot mechanism can be adapted to engage the latch mechanism when the cord is extended from the reel less than a predetermined length to prevent the operation of the latch mechanism. The latch pilot mechanism can be disengaged from the latch mechanism once the cord is extended greater than the predetermined length from the reel. The latch pilot mechanism can have different configurations and can be adapted to engage and disengage the latch mechanism at one or more predetermined lengths.

34 Claims, 13 Drawing Sheets

U.S. PATENT DOCUMENTS

| | | |
|---|---|---|
| 5,114,091 | 5/1992 | Peterson et al. . |
| 5,117,456 | 5/1992 | Aurness et al. . |
| 5,156,242 | 10/1992 | Ditzig . |
| 5,230,481 | 7/1993 | Wheeler et al. . |
| 5,241,593 | 8/1993 | Wagner . |
| 5,299,670 | 4/1994 | Willard . |
| 5,354,954 | 10/1994 | Peterson . |
| 5,516,986 | 5/1996 | Peterson et al. . |
| 5,600,719 | 2/1997 | Lovecky et al. . |
| 5,655,726 | 8/1997 | Peterson et al. . |
| 5,819,893 | 10/1998 | Wagner et al. . |
| 6,019,304 | 2/2000 | Skowronski et al. . |
| 6,019,630 | 2/2000 | Alpert . |

\* cited by examiner

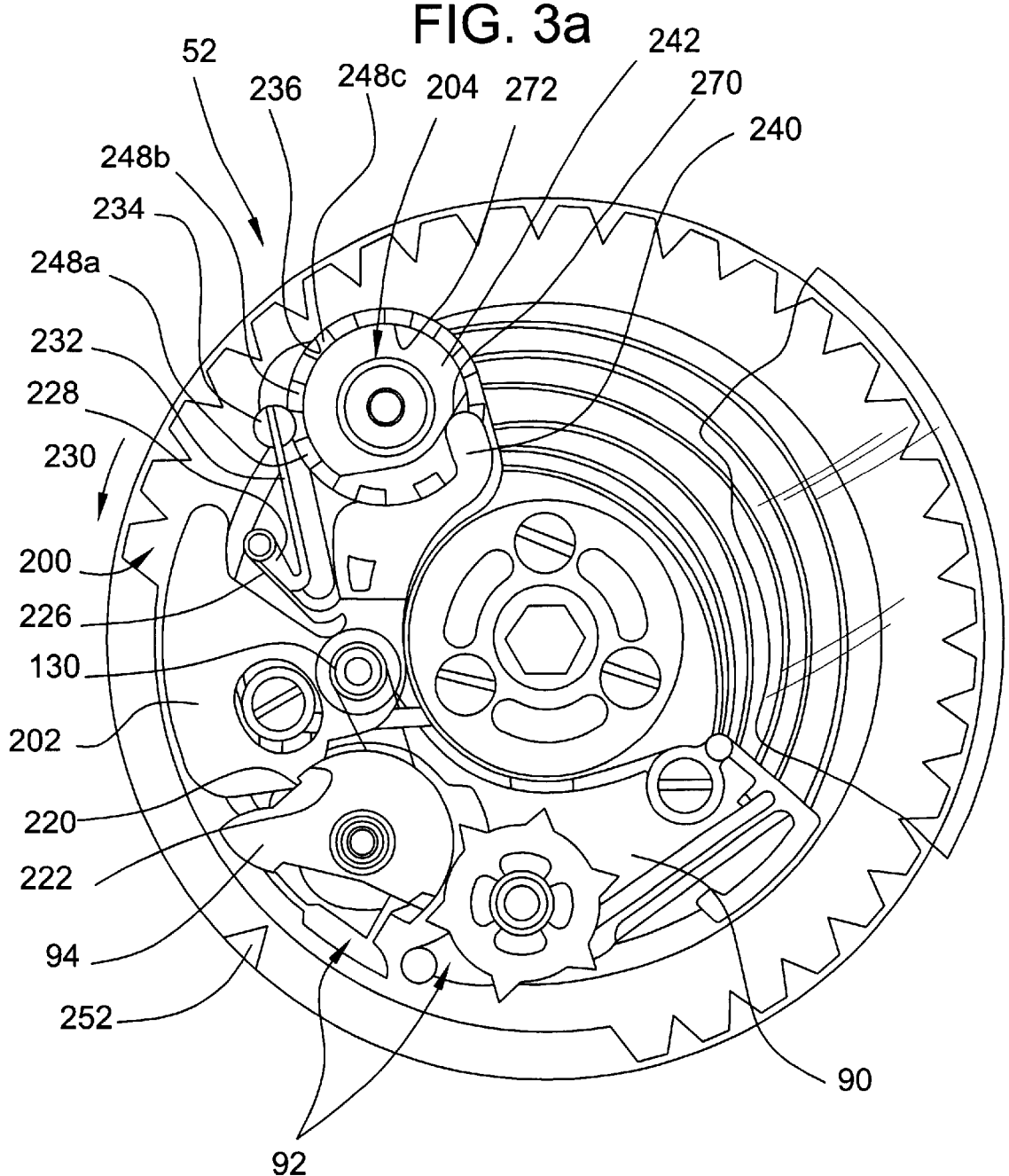

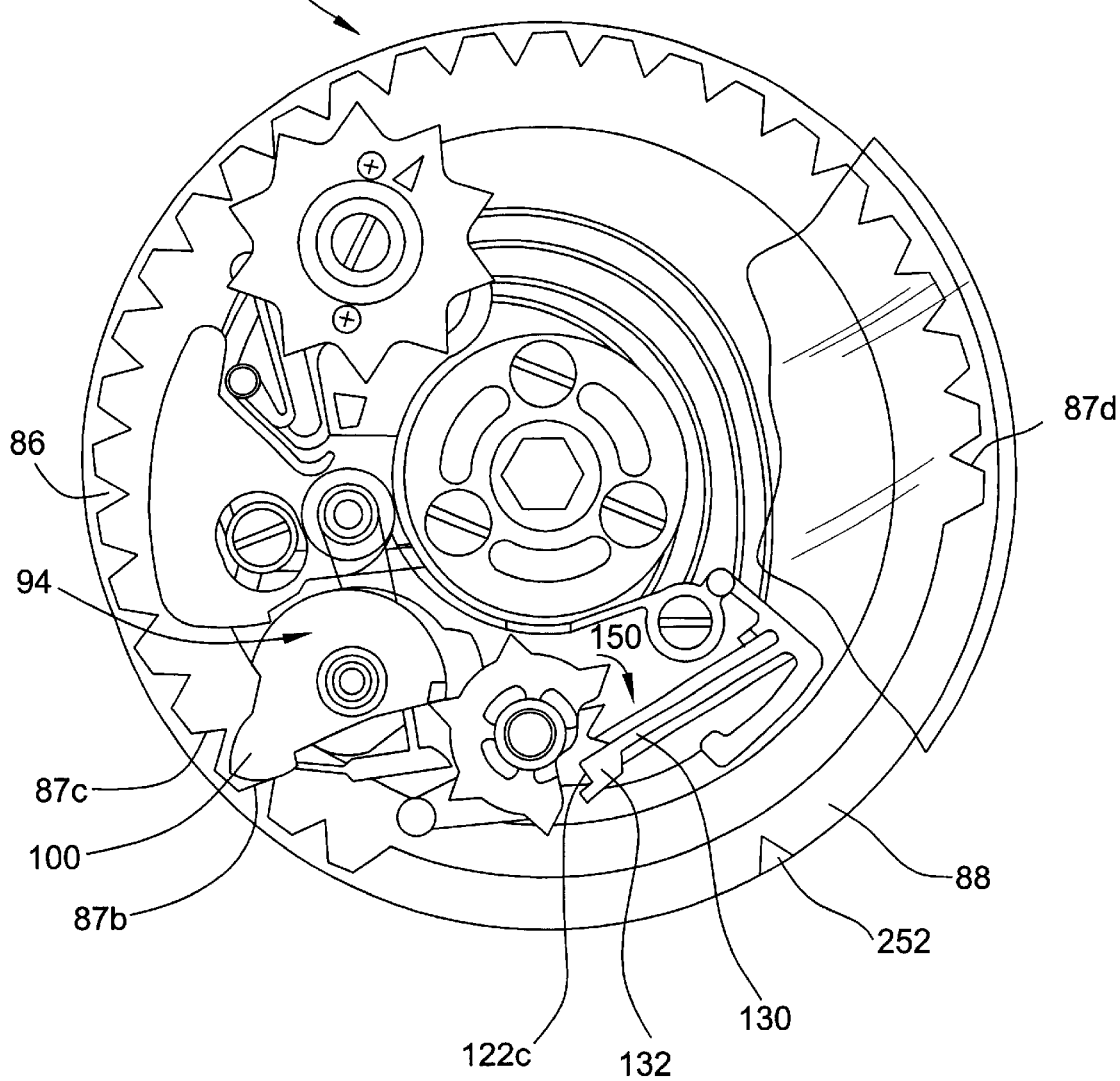

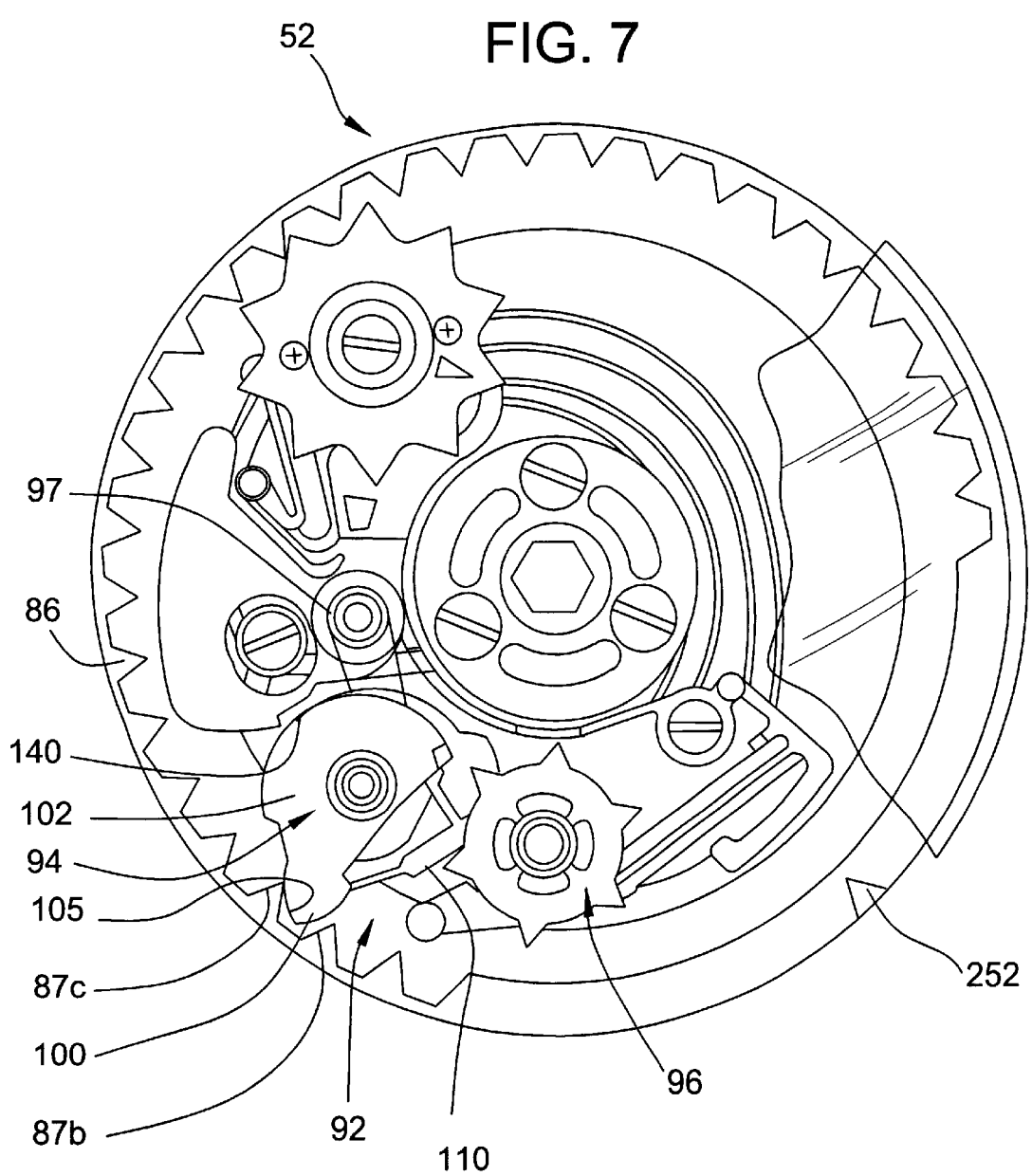

TWO-STAGE RETRACTABLE CORD REEL

FIELD OF THE INVENTION

The invention relates generally to a retractable cord reel, and more particularly, to a latching system for latching the cord in an extended position.

BACKGROUND OF THE INVENTION

Retractable cord reels have been widely used in many applications, especially in telephonic applications. One type of cord reel includes a mechanism for automatically winding the cord. In this reel, the extended cord is constantly under tension. In other words, the user must exert some amount of force to prevent the cord from retracting onto the reel.

To facilitate the use of the cord, a latch mechanism has also been provided that can be operated to fix the cord in a desired, extended position. Typically, the latch mechanism includes a ratchet or pawl-type member that mechanically locks the cord in place after a user extends the cord to a desired position. To release the latch mechanism, the user applies a short pull on the cord. Thereafter the cord is free to retract onto the reel. A potential problem with this latch mechanism occurs where the cord is completely extended and latched in the completely-extended position. In that instance there is no available cord remaining on the reel to allow the user to apply the short pull to free the latch mechanism. The prior art has provided some solutions for this problem by disclosing various ways to prevent the latch mechanism from operating only over the last few inches of cord extraction.

After use of a cord in an extended position, the cord is normally stored on the reel. To do so, the user pulls on the cord and disengages the latch mechanism, thereby allowing the cord to retract onto the reel. Typically a free end of the cord is attached to an implement, a telephone handset, for example. While the cord is being wound onto the reel, the user also is attempting to store the implement in a desired storage location. For example, a telephone handset can be stored on a cradle. During retraction of the cord, the user guides the implement to its storage location. A hesitation in the movement of the retraction of the cord, or a slight extension of the cord, can trigger the latch mechanism, operating to latch the cord in place at an undesired time. When inadvertent latching occurs near the end of the act of storing the implement, a small amount of cord may remain extended even though the implement is in its stored location. This small amount of cord is unsightly and exposes the cord to damage.

This problem is particularly acute where the telephone is placed in a cradle found in a typical airplane setting. Because space is limited on an airplane, the handset is often stored in a receptacle mounted on a seatback of a chair. The receptacle is configured to closely conform to the handset. In the event that the user unintentionally triggers the latch mechanism leaving a small amount of the cord extended, the cord can prevent the handset from properly seating in the receptacle and the handset cannot be stored. In addition, the cord can be pinched between the handset and a wall of the receptacle, causing damage to the cord and wedging of the handset in the cradle.

SUMMARY OF THE INVENTION

The invention is directed toward providing a mechanism for selectively enabling and preventing a latch mechanism used in a cord reel at one or more selected lengths of cord.

According to the invention, a lever is provided that will interrupt the operation of a direction sensor at any desired point or points. A cam wheel can be adapted to trigger the preventing function at the desired point or points.

In one embodiment, a selectively retractable cord reel storage assembly includes a reel that is rotatable to wind and unwind a length of material, a telephone cord, for example. The storage assembly includes a latch mechanism for latching the cord in an extended position. A pilot mechanism is operably engageable with the latch mechanism. The pilot mechanism is movable between a first and a second position, wherein in the first position the pilot mechanism prohibits the functioning of the latch mechanism, and wherein in the second position the latch mechanism is operable.

In other embodiments, a plurality of points along the range of cord extension between being fully wound onto the reel and being fully extended from the reel can be provided whereat the latch pilot mechanism switches between the engaged and disengaged conditions, respectively preventing the latch mechanism and allowing the latch mechanism to operate.

In another aspect of the invention, a storage assembly having a reel for storing a length of material includes a direction sensor and a lever. The direction sensor is operably arranged with the reel. The direction sensor can latch the reel such that the reel is prevented from moving in a retraction direction for winding the material onto the reel. The lever is operably engageable with the direction sensor. The lever is movable between an engaged position and a disengaged position. When the lever is in the engaged position, the lever prevents the direction sensor from operating to latch the reel. When the lever is in the disengaged position, the direction sensor is free to operate to latch the reel. The lever can be automatically placed in the engaged position over a desired range of lengths of material extending from the reel.

A plate can support the latch mechanism and the latch pilot mechanism. The reel, the plate, the latch mechanism, and the latch pilot mechanism can be stored in a housing. The plate can be mounted to the housing. The reel is free to rotate in the housing to wind and unwind the cord.

In operation, the retractable cord reel features a two-stage system. When the cord is extended more than a predetermined length, such as eighteen inches, from the reel, for example, the cord may be locked in place. To release the cord from this locked position, a short pull is made on the cord. To return the telephone handset to its stored position in a cradle from a point where the cord is extended more than approximately eighteen inches, the cord is pulled and released. Thereafter, the cord is permitted to retract and to rewind onto the reel. While the latching cord reel of the prior art allowed for the cord to be latched at any position short of the fully-extracted position, the two-stage retractable cord reel of the present invention cannot be locked in place when the cord is extended less than the predetermined length, such as eighteen inches. In summary, so long as the cord is extended less than the predetermined length, e.g., eighteen inches, from the reel, the latch mechanism cannot be operated. The retraction mechanism mounted to the reel will fully retract the cord without leaving a "pigtail" of cord. This full retraction feature prohibits inadvertent locking of the cord with only an inch or two extended and avoids the problem of a pigtail of cord being pinched or wedged between the handset and the cradle.

In one method for selectively latching a length of material wound onto a reel, a latch mechanism and a pilot mechanism are provided. The pilot mechanism is engaged with the latch mechanism to prevent the operation of the latch mechanism over a predetermined range of travel of the length of material from the reel. The material is extended to a length greater than the predetermined length to disengage the pilot mechanism from the latch mechanism and to allow the latch mechanism to latch the cord.

In the following description, reference is sometimes made to the "top," "bottom," or other regions of the cord reel and its various components. It should be understood that these terms are used solely for convenient reference, inasmuch as the cord reel may be used omnidirectionally.

DESCRIPTION OF THE DRAWINGS

FIG. 3a is a top plan view of the cord reel assembly of the invention with a top portion of a cam wheel of the latch pilot mechanism removed for illustrative purposes;

FIG. 6a is a top plan view of the cord reel assembly of the invention with the top portion of the gear wheel removed for illustrative purposes;

FIG. 7 is a top plan view of the cord reel assembly of the invention illustrating the direction sensor in an extracted position.

DETAILED DESCRIPTION OF THE EXEMPLIFIED EMBODIMENTS

Figure 1:
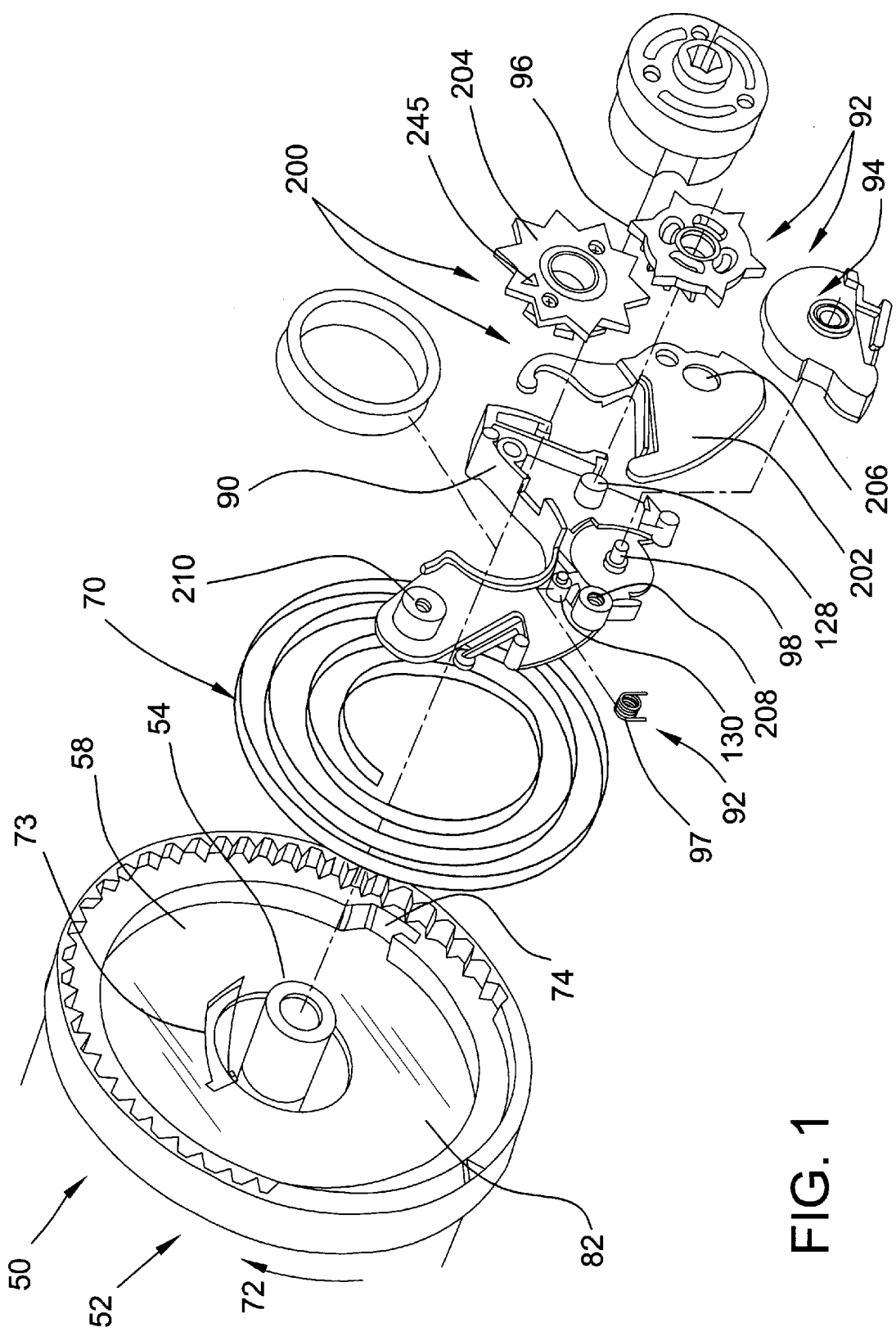
FIG. 1 is an exploded view of a cord reel assembly according to the present invention.

The exemplified embodiments of the present invention illustrate a selectively retractable cord reel assembly having a reel to store a cord, a retraction mechanism to wind the cord onto the reel, a latch mechanism to latch the cord in an extended position, and a latch pilot mechanism configured to enable and to disengage the latch mechanism at one or more desired points of cord extension. In the operation of one embodiment, a user pulls on a free end of a cord to unwind the cord from the reel. The latch pilot mechanism acts to prevent the latch mechanism so that the latch mechanism cannot latch the cord when the cord is in a range of positions between being fully wound onto the reel and being extended a predetermined length. Once the cord is extended beyond the predetermined length, the latch pilot mechanism allows the latch mechanism to operate normally. The latch mechanism continues to operate normally until the cord is retracted to less than the predetermined length, whereupon the latch pilot mechanism again prevents the latch mechanism from operating.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

Figure 2:
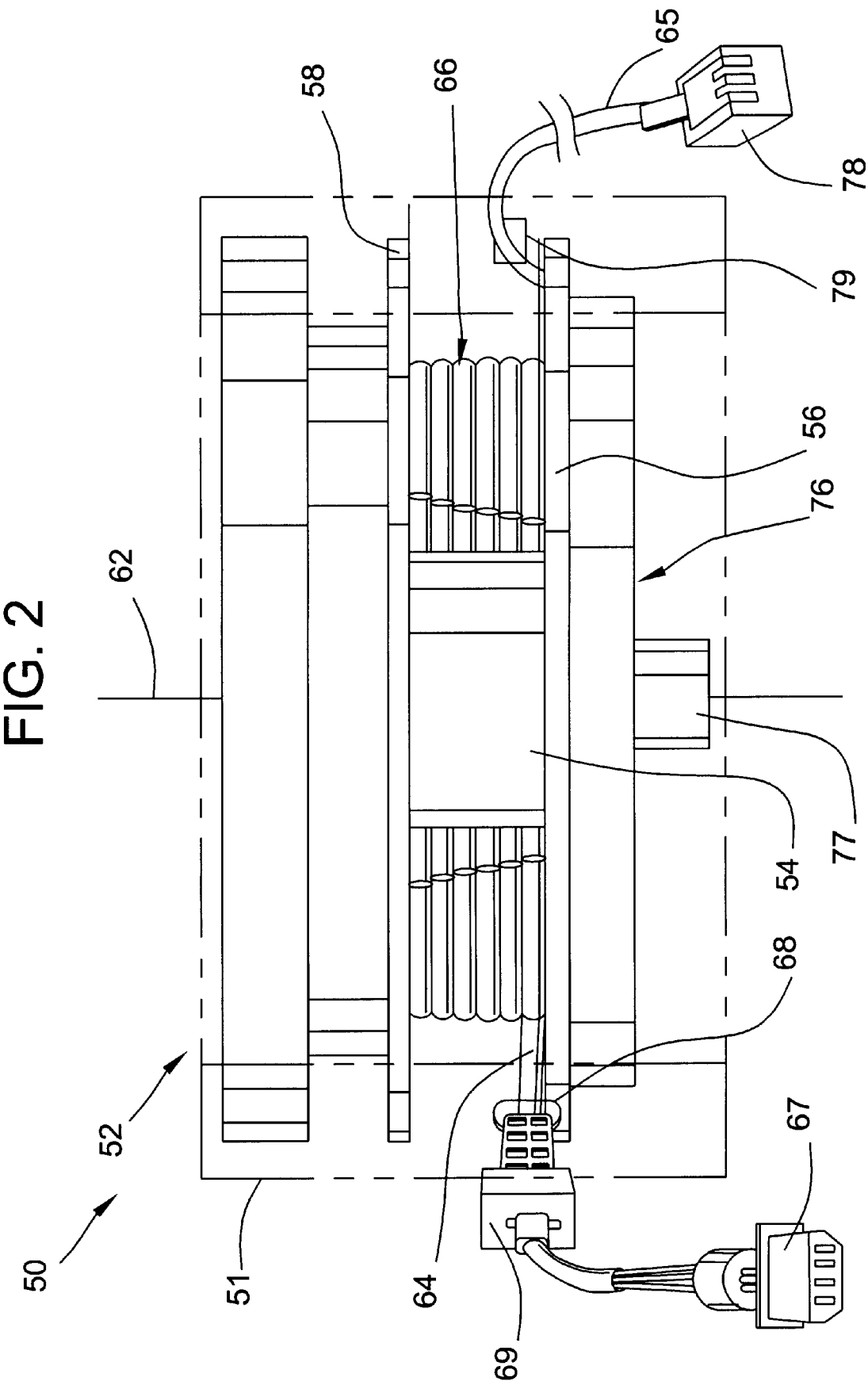
FIG. 2 is a side elevational view of the cord reel assembly of the invention.
Figure 3:
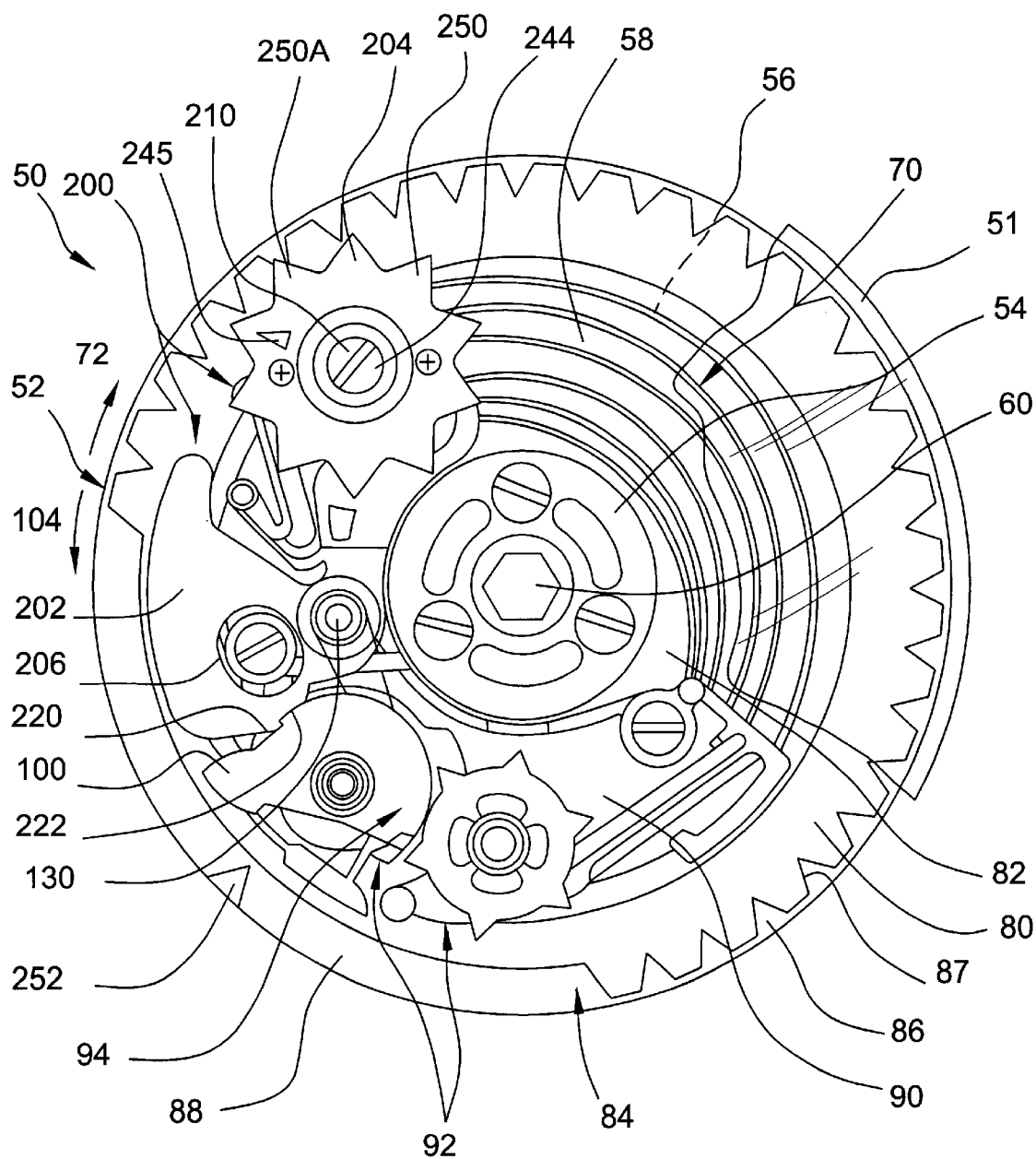
FIG. 3 is a top plan view of the cord reel assembly of the invention illustrating the latch pilot mechanism in an engaged position preventing the latch mechanism from operating.

Referring now to the drawings, there is shown an illustrative selectively retractable cord reel assembly 50 disposed in a housing 51 (shown in FIG. 3). Referring to FIGS. 1, 2, and 3, the reel assembly 50 includes a reel 52 having a hub 54, a first wall 56, and a second wall 58. The first and the second walls 56, 58 depend from the hub 54 and are in lateral, spaced relation to each other. The reel 52 includes a central mounting hole 60 located in the hub 54 for rotationally mounting the reel 52 such that the reel assembly 50 is free to rotate about a transverse axis 62, as shown in FIG. 2.

The second wall 58 includes a projecting flange portion 80 that defines a compartment 82. The flange portion 80 is generally circular and includes a rim 84 having an internal gear portion 86 with a plurality of teeth 87 projecting inward and a wall portion 88, referred to as a "dead zone." The internal gear portion 86 and the dead zone portion 88 will be discussed in greater detail herein.

Referring to FIG. 2, the reel 52 can be used for storing a length of material such as string or wire cord, for example. An illustrative wire cord 64 is wound onto the reel 52 and stored in a recess 66 defined by the first and the second walls 56, 58. The cord 64 can be of any suitable construction that is sufficiently flexible to be wound in a diameter generally conforming to the diameter of the hub 54. The cord 64 can be any known type, such as, communication, telephone, data, electrical, or other type. The illustrative cord 64 is approximately forty inches long. The cord 64 can be unwound from the reel. The reel 52 is configured such that it must undergo approximately nine and one-half turns to fully take up or to unwind the cord 64.

One end of the cord 64 is secured to the reel 52 by any suitable method and the other end of the cord can extend out from the housing and has a connector 67 for connection to an implement, such as a telephone handset. The housing 51 can be constructed such that it includes an aperture 68 through which the cord can extend. A stop 69 is mounted to the cord 64 adjacent the free end of the cord. To prevent the free end of the cord from entering the housing 51, the stop 69 is configured such that it can not pass through the aperture 68. The stop 69 can be made from a flexible material, such as rubber, or from any other suitable material. The cord 64 is fully wound onto the reel 52 when the stop 59 is engaged with the housing 51 as seen in FIG. 2.

In another embodiment, the aperture 68 can be configured such that the connector 67 cannot pass through the aperture 68. With that construction for the aperture, the cord is fully wound onto the reel 52 when the connector 67 is closely adjacent the housing 51.

Figure 1A:
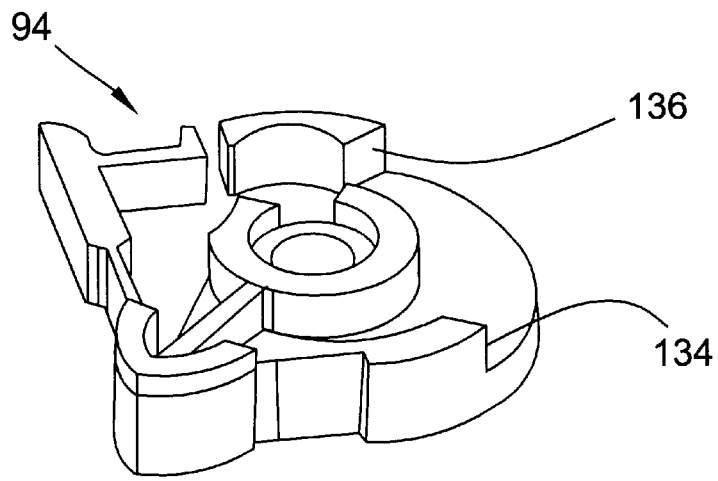
FIG. 1a is a bottom plan view of the direction sensor.

As best seen in FIG. 1, the reel assembly 50 includes a retraction mechanism 70 in the form of a spring mounted to the reel 52 for rotationally biasing the reel to rotate in a retraction direction 72. The spring 70 is connected to the reel 52. At one end the spring 70 is inserted in a slot 73 in the second wall 58 of the reel and at the other end the spring 70 is inserted into a groove 74 in the second wall 58. When the cord is fully wound onto the reel 52, the spring 70 is disposed in a normal position with the spring arranged in loose generally concentric rings around the hub 54. As the cord is extracted, the reel 52 rotates causing the spring 70 to rotate in turn. The spring 70 tightens inward upon itself, consequently developing a return force that tends to act toward returning the spring 70 to its normal position. When the cord is released, the return force of the spring 70 acts to retract the cord onto the reel 52. Although the retraction mechanism is illustrated as a spring, any suitable retraction mechanism can be used in the cord reel assembly 50 of the present invention The reel assembly 50 also includes a mounting plate 90 disposed within the compartment 82. The mounting plate 90 is mounted to the housing such that the reel 52 can rotate relative to the mounting plate 90. A latch mechanism 92 for selectively latching the cord in a desired extended position is mounted to the mounting plate 90. The exemplary latch mechanism 92 includes a direction sensor 94 operably arranged with a gear wheel 96 and a spring 97. The direction sensor 94 is rotationally mounted to a first post 98 projecting from the mounting plate 90 such that the direction sensor 94 can rotate about the first post 98. The gear wheel 96 of the latch mechanism 92 is rotationally mounted to a second post 128 projecting from the mounting plate 90 such that the gear wheel 96 can rotate about the second post 128. The spring 97 is mounted to a third post 130 projecting from the mounting plate 90. The spring 97 includes two free ends extending from the third post 130 between the mounting plate 90 and the direction sensor 94. The ends of the spring can be placed in contact with respective stops 134, 136 of the direction sensor 94, shown in FIG. 1a.

Figure 1B:
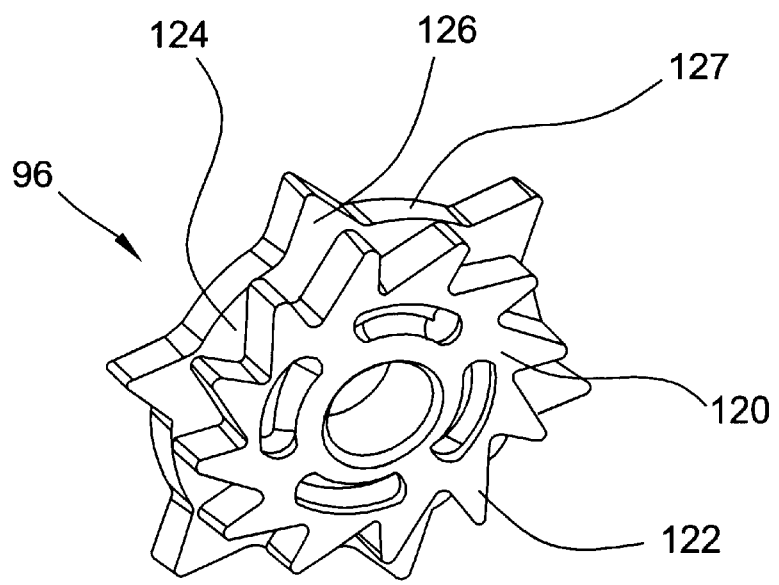
FIG. 1b is a bottom perspective view of the gear wheel.
Figure 1C:
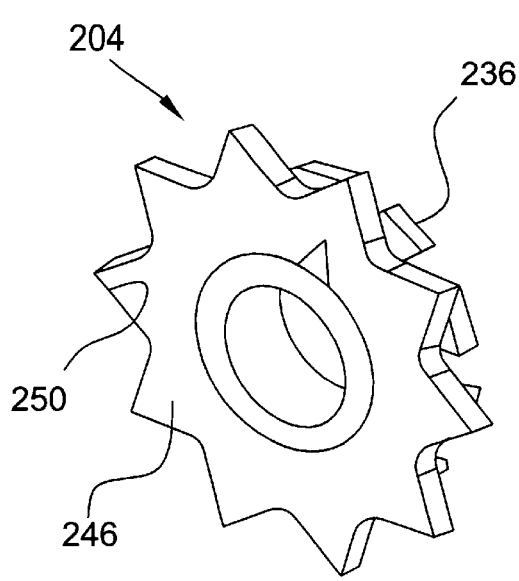
FIG. 1c is a perspective view of the cam wheel.
Figure 1D:
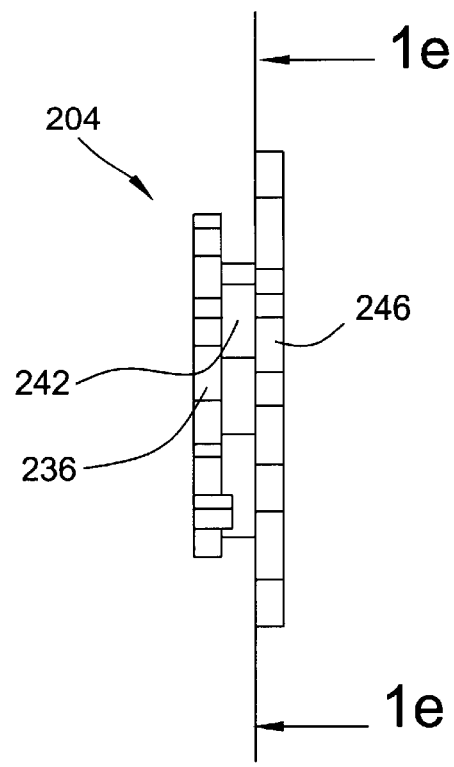
FIG. 1d is a side elevational view of the cam wheel depicted in FIG. 1c.
Figure 1E:
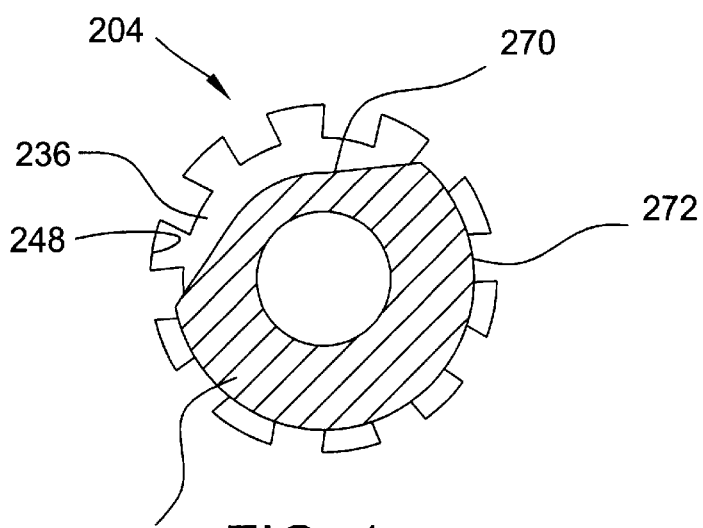
FIG. 1e is a cross-sectional view of the cam wheel taken along line 1e—1e in FIG. 1d.

Referring to FIGS. 1 and 1b, the gear wheel 96 of the latch mechanism 92 includes a bottom gear portion 120 preferably having twelve bottom teeth 122 and a top gear portion 124 preferably having six top teeth 126. The top teeth 126 are disposed in substantially uniform spaced relation to each other around the wheel, as are the bottom teeth 122. The bottom teeth 122 are arranged such that the base of one bottom tooth 122 is aligned with the base of each top tooth 126 and such that the base of one bottom tooth 122 is disposed substantially in the center of a gap 127 between each pair of adjacent top teeth 126. The bottom teeth 122 preferably are shaped in triangles that include one side having an acute angle and another side having an obtuse angle with respect to the base. The top teeth 126 preferably are shaped in generally isosceles triangles. When twelve bottom teeth and six top teeth are used, the arc defined by each pair of adjacent bottom teeth 122 is approximately 30°, and the arc defined by each pair of adjacent top teeth 126 is approximately 60°.

As best seen in FIG. 1, in accordance with the teaching of the present invention, a latch pilot mechanism 200 is mounted to the mounting plate 90. The latch pilot mechanism 200 is provided to engage and disengage the latch mechanism 92 at one or more desired points of cord extraction. The latch mechanism 92 is operable to selectively latch the cord only when the latch pilot mechanism 200 is disengaged from the latch mechanism 92, thereby allowing the latch mechanism 92 to operate normally. In operation, the latch pilot mechanism 200 inhibits the operation of the latch mechanism 92, for example, while the cord is in a range from being fully retracted onto the reel 52 to being extracted about eighteen inches from the reel 52. When the cord is extracted beyond eighteen inches, for example, the latch pilot mechanism 200 is disengaged, and the latch mechanism 92 operates normally to latch the cord in a desired position.

The latch pilot mechanism 200 includes a lever 202 and a cam wheel 204. The lever 202 is rotationally mounted to the third post 130 such that the lever 202 can rotate about the third post 130. The lever 202 includes an elongated slot 206 to accommodate a mounting hole 208 in the mounting plate 90. The cam wheel 204 is rotationally mounted to a fourth post 210 projecting from the mounting plate 90 such that the cam wheel 204 can rotate about the fourth post 210. To facilitate assembly by indicating a specific attitude, the cam wheel 204 is preferably provided with a triangular-shaped recess 245 or other marking indicator.

Referring to FIGS. 1, 1c, 1d, and 1e, the cam wheel 204 has a bottom gear portion 236, a top gear portion 246, and a cam lobe 242. The cam lobe 242 includes a minor diameter 270 and a major diameter 272. The bottom gear portion 236 of the cam wheel 204 preferably has ten bottom teeth 248, and the top gear portion 246 likewise preferably includes ten top teeth 250. The bottom teeth 248, as well as the top teeth 250, are disposed in uniform spaced relation to each other. The arc defined by each pair of adjacent bottom teeth 248, and by each pair of adjacent top teeth 250, is approximately 36°.

Referring to FIG. 2, a flexible strip 76 is connected at one end to a collar 77 projecting from the first wall 56 and to one end of the cord 64. The flexible strip 76 is connected at the other end to a printed circuit board disposed within the housing, for example. The printed circuit board is in turn connected to a second cord 65. The flexible strip 76 provides electrical continuity between the cord 64 and the printed circuit board and the second cord 65. In the illustrative cord reel assembly 50, the second cord 65 is connected at one end to the printed circuit board such that a free end of the second cord 65 extends a predetermined length from a second aperture 79 of the housing 51. A connector 78 for connection to an implement, such as a telephone base, is provided at the free end of the second cord 65. Alternatively, the free end of the second cord 65 could be wired to telephone lines, for example, or another suitable power source.

When the cord 64 is fully wound onto the reel 52, the flexible strip 76 is disposed in a normal position with the spring arranged in loose generally concentric rings around the collar 74. As the cord 64 is extracted, the collar 74 of the reel 52 rotates causing the end of the flexible strip 76 connected to the collar 74 to rotate in turn. The flexible strip 76 tightens inward upon itself. When the cord 64 is retracted, the flexible strip 76 returns to its normal position.

As seen in FIG. 3, the latch pilot mechanism 200 is engaged with the latch mechanism 92 to prevent the latch mechanism 92 from operating. The lever 202 is operably arranged with the direction sensor 94 and with the cam wheel 204. The lever 202 includes a notched locking surface 220 that can be placed in contact with an opposing seat 222 of the direction sensor 94, as shown in FIG. 3. The locking surface 220 is engaged with the seat 222 such that the direction sensor 94 is placed in an inhibited position. In the inhibited position, the direction sensor 94 is disposed so that the teeth 87 of the internal gear portion 86 cannot contact the direction sensor 94 as the teeth 87 rotate, thereby preventing the latch mechanism 92 from operating.

The top teeth 250 of the cam wheel 204 are each configured to be engageable with a triangular-shaped cam driver 252 projecting from the rim 84 of the second wall 56 of the reel 52 and disposed approximately at the center of the dead zone 88 of the rim 84. The cam driver 252 can engage one top tooth 250a of the top teeth 250 of the cam wheel 204 to cause the cam wheel 204 to rotate 36 degrees, i.e., one-tenth of a revolution of the cam wheel 204, for each revolution of the reel 52. The cam driver 252 operates to rotate the cam wheel 204 in both the retraction direction 72 and an extraction direction 104, which is opposite to the retraction direction.

Referring to FIG. 3a, a bearing wall 228 projecting from the plate includes a resiliently flexible cam catch 232 extending therefrom. The cam catch 232 has a protrusion 234 at its free end that is operably arranged with the bottom gear portion 236 of the cam wheel 204. The cam catch 232 provides an indexing function to ensure that the cam wheel 204 rotates in a one-tenth-revolution increment for each revolution of the reel 52. The protrusion 234 is engaged with the bottom gear portion 236 of the cam wheel 204 and is disposed between a pair of adjacent bottom teeth 248a, 248b. When the cam driver 252 engages the cam wheel 204, the protrusion 234 flexes away from the bottom gear portion 236 and bears against one tooth 248b of the bottom teeth 248, allowing the cam wheel 204 to rotate. The cam wheel 204 rotates until the bottom tooth 248b upon which the protrusion 234 rides moves past the protrusion 234. The protrusion 234 then returns toward the bottom gear portion 236, lodging between the next pair of adjacent bottom teeth 248b, 248c that includes the bottom tooth 248 upon which the protrusion 234 just rode.

In FIG. 3a, the latch pilot mechanism 200 is shown engaged with the latch mechanism 92. The lever 202 of the latch pilot mechanism 200 includes a cam follower 240 that is operably arranged with the cam lobe 242 of the cam wheel 204. The cam lobe 242 is configured to prevent the operation of the latch mechanism 92 over a range of extracted cord length from zero to approximately eighteen inches. When the cam follower 240 is in contact with the minor diameter 270 of the cam lobe 242, the latch pilot mechanism 200 is engaged with the latch mechanism 92, thereby preventing the operation of the latch mechanism 92. When the cam follower 240 is in contact with the major diameter 272 of the cam lobe 240, the latch pilot mechanism 200 is disengaged from the latch mechanism 92, thereby allowing the latch mechanism 92 to operate normally.

The arc defined by the minor diameter 270 is at least 108°, i.e., the arc is configured to encompass three positions of the bottom gear portion. From the cord being fully wound onto the reel 52, after three turns of the reel 52, equivalent to a length of extracted cord approximately eighteen inches long in this embodiment, the cam follower 240 is then located on the major diameter 272 of the illustrative cam lobe 242.

The lever 202 also includes an integral leaf spring 226. The bearing wall 228 projecting from the mounting plate 90 flexes the leaf spring 226, which in turn biases the lever 202 to rotate in an inhibit direction 230. The leaf spring 226 biases the lever 202 such that the locking surface 220 of the lever 202 is biased to move toward the seat 222 of the direction sensor 94 to interferingly engage the locking surface 220 with the seat 222, thereby preventing the latching function of the latch mechanism 92.

Figure 4:
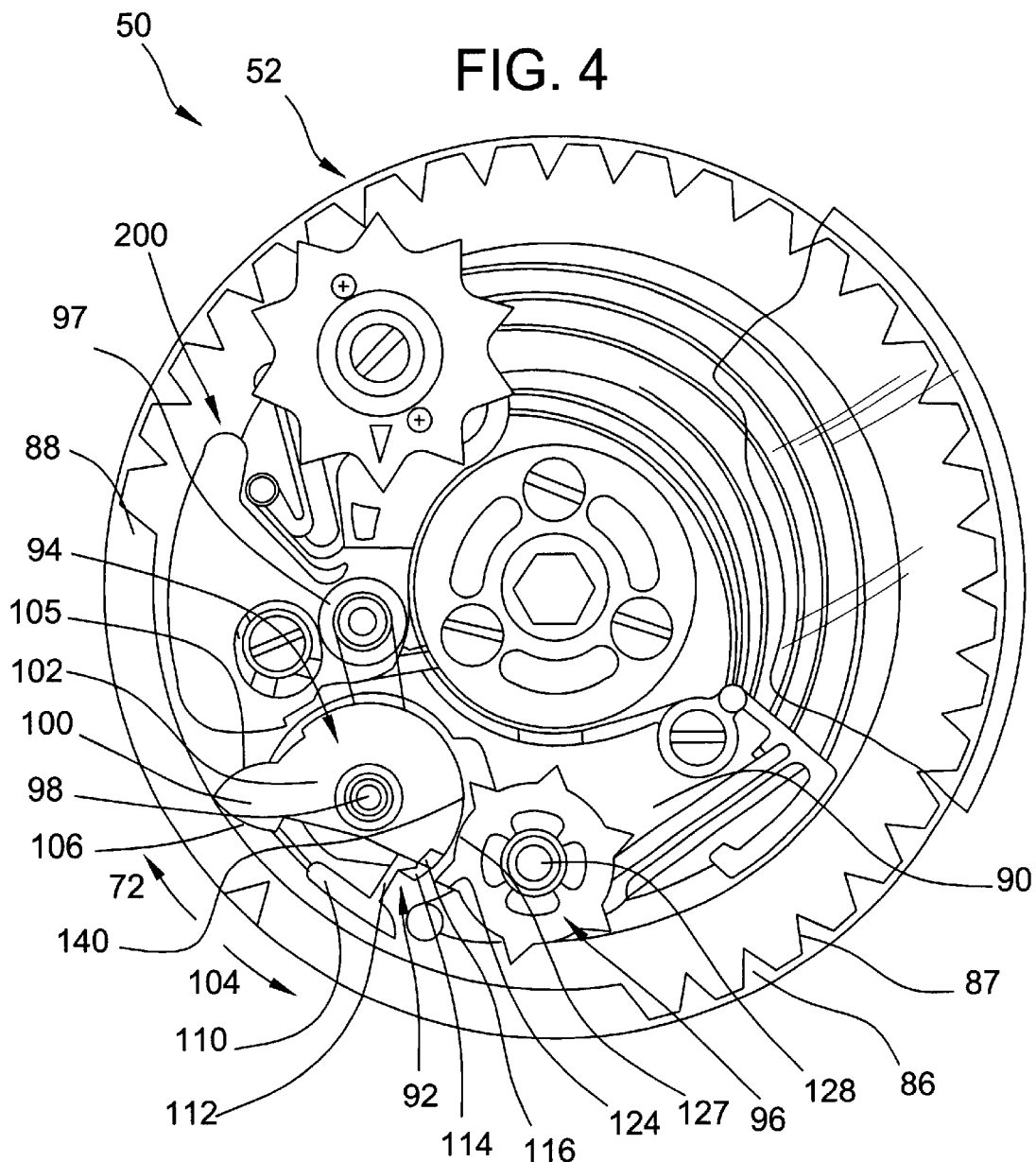
FIG. 4 is a top plan view of the cord reel assembly of the invention illustrating the latch pilot mechanism in a disengaged position allowing the latch mechanism to selectively operate.

Referring to FIG. 4, the latch pilot mechanism 200 is disengaged from the latch mechanism 92. With the latch pilot mechanism 200 disengaged from the latch mechanism 92, the direction sensor 94 can rotate in the retraction direction 72 and in the extraction direction 104. The direction sensor 94 is operably arranged with the teeth 87 of the internal gear portion 86 such that the direction sensor 94 can be moved between a retracted position and an extracted position. The direction sensor 94 moves between the retracted and the extracted positions according to the rotation of the reel 52. In other words, the direction sensor 94 is in a retracted position when the reel is rotating in the retraction direction 72 and in an extracted position when the reel 52 is rotating in the extraction direction 104. The direction sensor 94 has a nose 100 extending from a base 102. The nose 100 is configured to intermesh with the teeth 87 of the internal gear portion 86. The nose 100 includes a retraction side 105 and an extraction side 106.

As seen in FIG. 4, the direction sensor 94 is shown in a retracted position. The nose 100 is resting against the dead zone 88. In the retracted position, the nose 100 is pointed in the retraction direction 72. The base 102 includes a generally circular portion 140 having a radius that substantially conforms to the contour of the gap 127 of the gear wheel 96. In construction, the base 102 can rotate about the first post 98 without contacting any of the top teeth 124 of the gear wheel 96 when the gear wheel 96 is in a free position.

A resiliently flexible shaft 110 projects from the nose 100. A hook 112 projects from near the distal end of the shaft 10 and is engaged with a hook 114 projecting from the base 102. The hooks 112, 114 retain the shaft 110 such that the shaft 110 is free to rotate about the nose 100 over a range of travel between the body 102 at one end and the point where the hooks 112, 114 engage each other at the other end. The hooks 112, 114 act to aid in the position of the shaft 110 such that the shaft 110 can selectively engage the gear wheel 96 during the operation of the latch mechanism 92. A peg 116 projects from the base 102. The peg 116 is arranged to be selectively engageable with the gear wheel 96 to lock the direction sensor 94 in place, thereby achieving the latching feature of the latch mechanism 92.

The gear wheel 96 is operably arranged with the mounting plate 90 such that the gear wheel 96 is incrementally movable between alternating free and latch positions. In moving to the extracted position, the direction sensor 94 is configured to rotate the gear wheel 96 one position, thereby alternately moving the gear wheel from a free position to a latch position or vice versa. When in the latch position, the gear wheel 96 is arranged to lock the direction sensor 94 in a latch position, thereby achieving the latching feature of the latch mechanism 92. The gear wheel 96 is shown in a free position in FIG. 4.

Figure 4A:
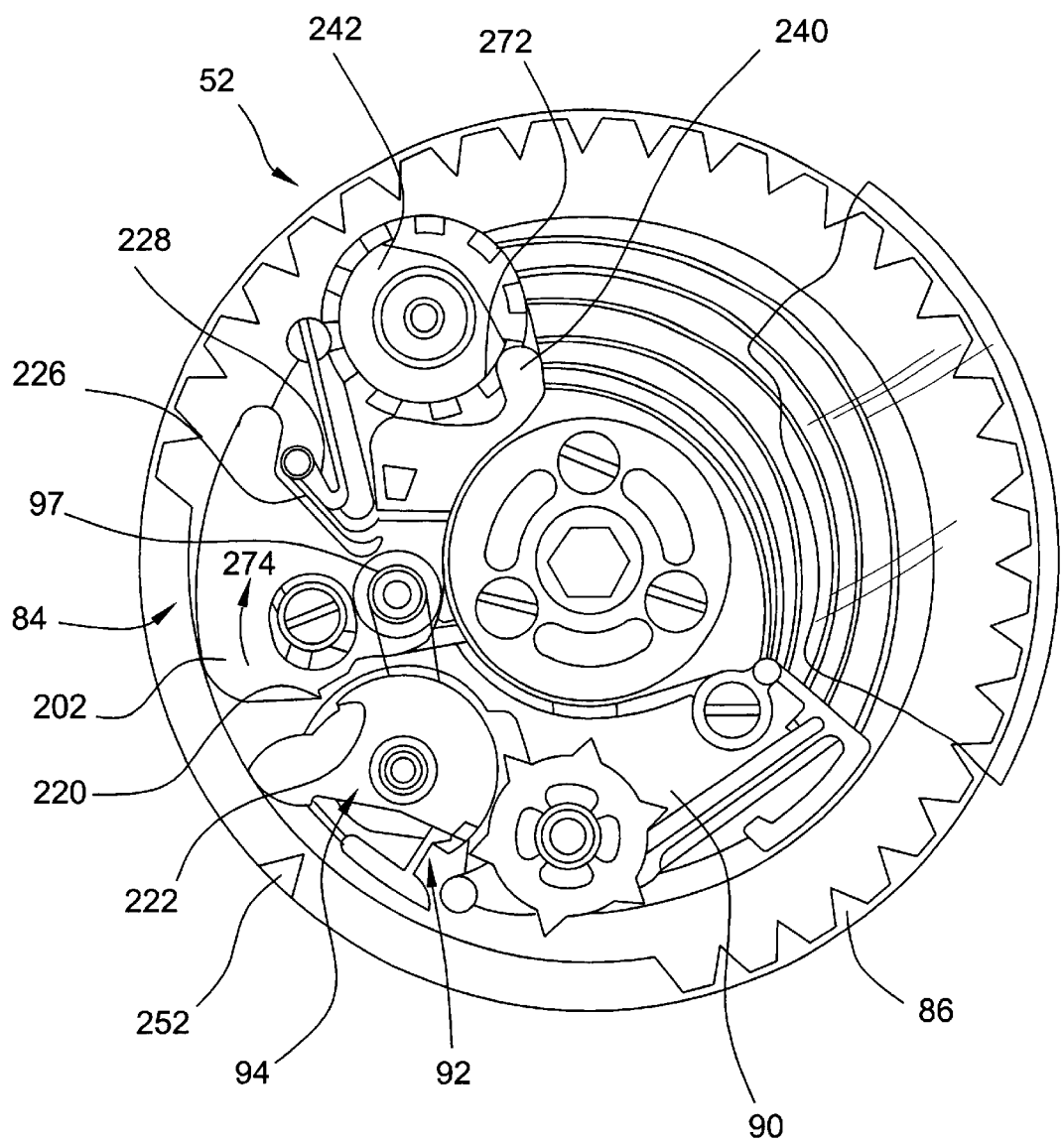
FIG. 4a is a top plan view of the cord reel assembly of the invention with the top portion of the cam wheel removed for illustrative purposes.

Referring to FIG. 4a, the repositioning of the cam follower 240 to the major diameter 272 resulted in the lever 202 rotating in a release direction 274 that disengaged the locking surface 220 of the lever 202 from the seat 222 of the direction sensor 94, thereby allowing the latch mechanism to function. The leaf spring 226 has been compressed an additional amount against the bearing wall 228 projecting from the mounting plate 90. The end of the spring 97 closest to the rim 84 has urged the direction sensor 94 toward the internal gear portion 86 of the rim 84 to the retracted position, wherein the latch mechanism 92 is operable.

Figure 5:
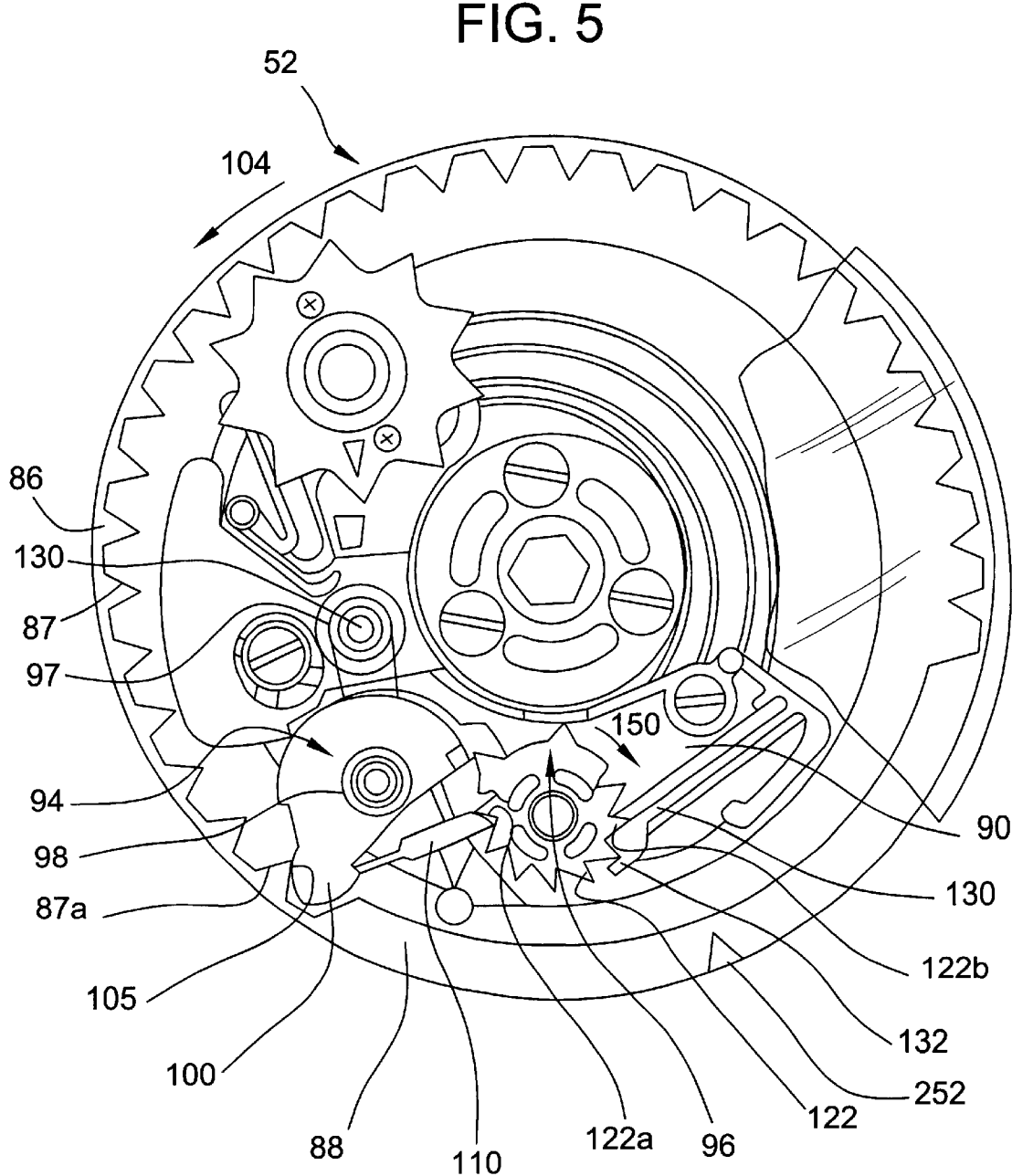
FIG. 5 is a top plan view of the cord reel assembly of the invention with a top portion of a gear wheel of the latch mechanism removed for illustrative purposes.

Referring to FIG. 5, the reel 52 has rotated a sufficient amount in the extraction direction 104 to cause the shaft 110 of the direction sensor 94 to contact one of the bottom teeth 122 of the gear wheel 96. The gear wheel 96 can rotate in an indexing direction 150 in one-twelfth revolution increments, alternating between a free position and a latch position. The mounting plate 90 includes a resiliently flexible gear catch 130 having a notched stop 132 at its free end. The gear catch 130 provides an indexing function to ensure that the gear wheel 96 rotates in a one-twelfth-revolution increment. The stop 132 of the mounting plate 90 is operably arranged with the bottom teeth 122 of the gear wheel 96. One of the bottom teeth 122 of the gear wheel 96 is seated in the stop 132. The stop 132 is configured to prevent the gear wheel 96 from rotating in a direction opposite the indexing direction 150. In FIG. 5, the gear wheel 96 is shown in a free position. As the direction sensor 94 continues to rotate in the extraction direction 104, the shaft 110 will cause the gear wheel 96 to rotate in the indexing direction 150 to move the gear wheel 96 to a latch position.

Figure 6:
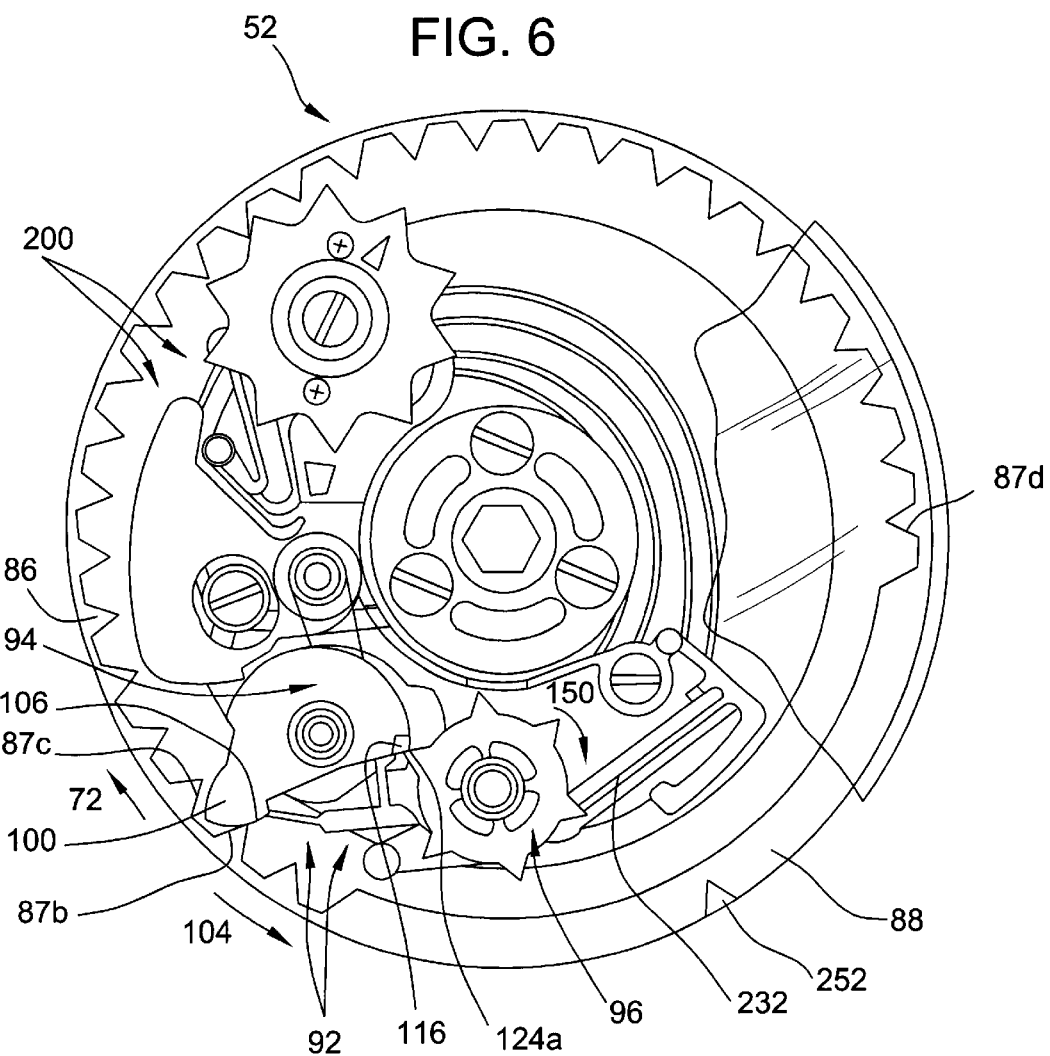
FIG. 6 is a top plan view of the cord reel assembly of the invention illustrating a direction sensor of the latch mechanism in a latch position.

Referring to FIG. 6, the latch mechanism 92 has latched the cord in a desired extended position. In this embodiment, the cord cannot be latched until the cord is extended greater than about eighteen inches from the reel, at which point the latch pilot mechanism 200 is disengaged from the latch mechanism 92. Of course, in other embodiments, the length of cord extended from the reel 52 necessary to disengage the latch pilot mechanism 200 from the latch mechanism 92 can be varied.

The direction sensor 94 is in a latched position. The gear wheel 96 is in a latch position. The gear catch 232 prevents the gear wheel 96 from rotating in a direction opposite the indexing direction 150. The peg 116 of the direction sensor 94 is in contact with one top tooth 124a of the top teeth 124. The engagement between the direction sensor 94 and the gear wheel 96 prevents the direction sensor from rotating in the retraction direction 72. The nose 100 is disposed between a pair of the teeth 87b, 87c of the internal gear portion 86 and prevents the retraction mechanism from operating. The cord is thus latched in place with a desired length extracted from the reel 52.

Referring to FIG. 3, in operation, starting with the cord fully retracted, the latch pilot mechanism 200 is engaged with the latch mechanism 92. At full cord retraction, the cam follower 240 is resting on the minor diameter 270 of the cam lobe 242, as shown in FIG. 3a. The direction sensor is in the inhibited position. Referring to FIG. 4, once a predetermined length of the cord is extracted from the reel 52, about eighteen inches in the illustrative embodiment of the cord reel assembly 50, the latch pilot mechanism 200 is disengaged from the latch mechanism 92. With the latch pilot mechanism 200 disengaged from the latch mechanism 92, the latch mechanism 92 can operate normally. The cam follower 240 is resting on the major diameter 272 of the cam lobe 242, as shown in FIG. 4a. The direction sensor 94 is in the retracted position. The nose 100 of the direction sensor 94 is in contact with the dead zone 88.

Referring to FIG. 5, the cord is payed out an additional amount, rotating the reel 52, including the teeth 87 of the internal gear portion 86, in the extraction direction 104. The tooth 87a adjacent the dead zone 88 contacts the retraction side 105 of the nose 100, which in turn rotates about the first post 98 in the extraction direction 104 and moves toward an extracted position. The free end of the shaft 110 engages one bottom tooth 122a, causing the gear wheel 96 to rotate one-twelfth of a revolution in an indexing direction 150. Another one 122b of the bottom teeth 122 moves the catch 130 toward the rim of the reel 52 to allow the gear wheel 96 to rotate. Once the point of the tooth 122b moves past the stop 132, the catch 130 returns to its normal position such that the tooth 122b is seated in the stop 132. The catch 130 provides an indexing feature to ensure the gear wheel 96 rotates in a one-twelfth revolution increment for each pass of the shaft 110 that moves the gear wheel 96 in the indexing direction 150. The gear wheel 96 is placed in a latch position, as shown in FIG. 6.

Referring to FIG. 5, after the free end of the shaft 110 moves past the gear wheel 96, the end of the spring 97 that is closest to the center of the reel 52 acts to bias the nose 100 toward the internal gear portion 86 in the direction of the retracted position. As the teeth 87 of the internal gear portion 86 rotate relative to the mounting plate 90, the teeth 87 contact the nose 100. The spring 97 urges the nose 100 back into contact with the next one of the teeth 87. This interplay between the spring 97, the direction sensor 94, and the teeth 87 creates an audible "clicking" feature and readies the direction sensor 94 to respond to a change in the rotation of the reel 52.

Referring to FIG. 6, because the user has extracted a length of cord greater than the predetermined length required to disengage the pilot latch mechanism from the latch mechanism, the latch mechanism operates normally. Once the user extracts the cord to a desired length, the cord can be released. Once released, the retraction mechanism in the form of a spring acts to retract the cord. In FIG. 6, the reel 52 has rotated in the retraction direction 72. The tooth 87b of the internal gear portion 86 that had just passed the nose 100 moving in the extraction direction 104 is brought into contact with the extraction side 106 of the nose 100. The direction sensor 94 in turn rotates in the retraction direction 72 until the peg 116 contacts one tooth 124a of the top teeth 124.

As seen in FIG. 6a, the catch 130 prevents the bottom tooth 122c seated in the stop 132 from rotating in a direction opposite the indexing direction 150, thereby fixing the direction sensor 94 in place. The nose 100 is disposed between a pair of the teeth 87b, 87c of the internal gear portion 86 and prevents the retraction mechanism from operating. The direction sensor 94 is in a latched position. The cord is thus latched in place with a desired length extracted from the reel 52.

As an added feature, the length of the cord and the position and size of the dead zone 88 can be configured such that upon full cord extraction from the reel 52, the nose 100 of the direction sensor 94 is in contact with the dead zone 88. In such a case the retraction mechanism will operate to retract the cord until the nose engages the tooth 87d adjacent the dead zone 88. The tooth 87d contacts the nose 100 to place the nose in a latch position. By configuring the dead zone 88 such that the cord must retract slightly from the fully extended position before allowing the nose 100 to be placed in a latch position, it is ensured that there will be a slight amount of cord remaining on the reel 52 sufficient to rotate the gear wheel 96 to a free position to unlatch the cord.

Referring to FIG. 7, to disengage the latch mechanism 92, the user can extract a length of cord from the reel 52 sufficient to cause the adjacent tooth 87c on the retraction side 105 to contact the nose 100, which, in turn, causes the shaft 110 to rotate. The shaft 110 contacts one of the bottom teeth of the gear wheel 96 to cause the gear wheel 96 to rotate one-twelfth of a revolution, positioning the gear wheel 96 in a free position such that the circular portion 140 of the body 102 can rotate freely with respect to the gear wheel 96. Upon release of the cord, the other adjacent tooth 87b of the internal gear portion 86 rotates the nose 100 to a retracted position. The retraction mechanism takes up the cord, which is wound onto the reel 52. During retraction of the cord, the spring 97 urges the nose 100 of the direction sensor 94 toward the teeth 87 of the internal gear portion 86.

It will be understood that the latch mechanism 92 can be triggered at any time during cord retraction, until the length of the cord is less than a predetermined length, here eighteen inches, by extracting the required length of cord to toggle the nose of the direction sensor to the extracted position, thereby rotating the gear wheel to a latch position. The latch mechanism will continue to be operable until the cord is retracted to a length less than the predetermined length, i.e., eighteen inches, at which time the cam follower returns to the minor diameter of the cam lobe to prevent the operation of the latch mechanism. The lever 206 is urged to rotate toward the direction sensor 94 by the leaf spring 226. The locking surface 220 engages the seat 222 and the direction sensor 94, in turn, rotates to the inhibited position.

Thus, in operation, the latch pilot mechanism 200 operates to prevent the latch mechanism 92 from operating over a desired range of travel. In use, a user extracts a cord fully wound onto a reel. After three revolutions, for example, of the reel, the latch pilot mechanism 200 is disengaged from the latch mechanism, and the latch mechanism is free to operate normally. Upon return of the cord onto the reel, the latch mechanism continues to operate normally until less than the predetermined length, i.e., eighteen inches, of cord is extended from the reel. At that point the latch pilot mechanism engages the latch mechanism and prevents the latch mechanism from operating.

Figure 8:
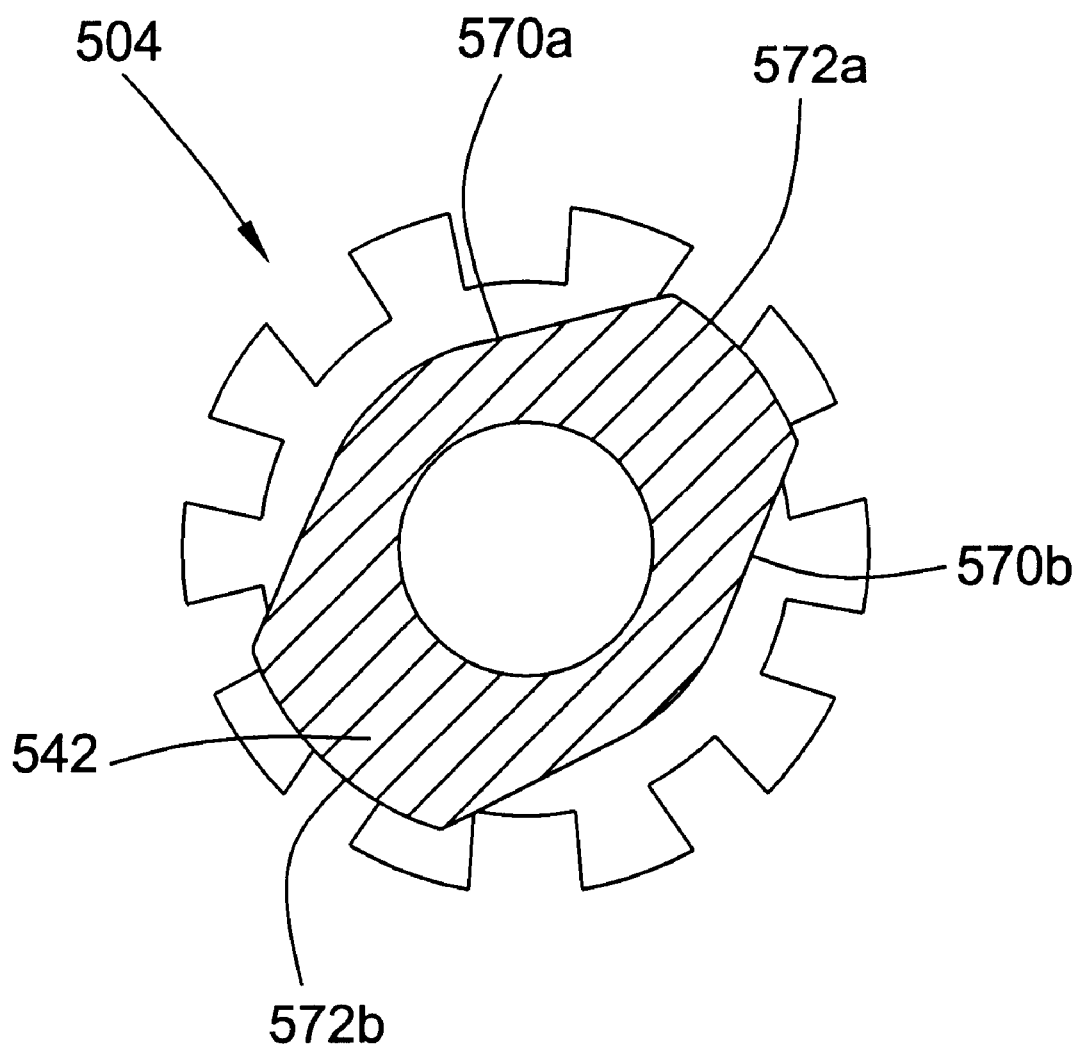
FIG. 8 is a cross-sectional view of another embodiment of a cam wheel.

It will be understood that the cam wheel can take on various configurations. For example, it will be understood that in other embodiments the minor diameter can define arcs of other sizes. Further, the cam lobe can be varied to include a plurality of minor diameters and/or a plurality of major diameters. For instance, referring to FIG. 8, a cam wheel 504 is shown that can allow the latch mechanism to operate at two distinct extensions of the cord. The cam wheel 504 includes a cam lobe 542 having two minor diameters 570a, 570b and two major diameters 572a, 572b. The two minor diameters provide two separate ranges of cord extraction over which the pilot mechanism can operate to prevent the operation of the latch mechanism.

In other embodiments, the number of the bottom teeth and the top teeth of the cam wheel can be varied to change the length of extracted cord that is necessary to toggle the latch pilot mechanism.

Furthermore, any suitable cord reel and retraction mechanism may be used. The latch pilot mechanism and latch mechanism of the present invention can be used with any cord reel that includes a cord that is desired to be retractable. Similarly, other latch mechanisms can be adapted to be used with a latch pilot mechanism.

All references, including publications, patent applications and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the present invention (especially in the context of the following claims) are to be construed to cover both the singular and the plural, unless otherwise indicated herein or clearly contradicted by context. The use of terms "including", "having" and "comprising" and like terms are to be construed as open ended terms, meaning including, but not limited to, unless otherwise indicated, or clearly contradicted by context, herein. The use of any and all examples, or exemplary language (e.g., "such as") provided herein is intended merely to better illuminate the present invention and does not pose a limitation on the scope of the claimed invention. No language in the specification should be construed as indicating any non-claimed element as essential to the practice of the invention.

The foregoing is an integrated description of the invention as a whole, not merely of any particular element or facet thereof. The description describes "preferred embodiments" of this invention, including the best mode known to the inventors for carrying it out. Of course, upon reading the foregoing description, variations of those preferred embodiments will become obvious to those of ordinary skill in the art. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is possible unless otherwise indicated herein or otherwise clearly contradicted by context.

What is claimed is:

1. A storage assembly for storing a length of cord, the storage assembly comprising:
   a reel rotatable to wind and unwind the length of material;
   a latch mechanism; and
   a pilot mechanism operably engageable with the latch mechanism, the pilot mechanism movable between a first and a second position, wherein in the first position the pilot mechanism prohibits the functioning of the latch mechanism and in the second position the latch mechanism is operable, and wherein the pilot mechanism moves between the first and second positions when a predetermined length of cord extends from the reel and is in the first position when the material extends less than the predetermined length from the reel.

2. The storage assembly of claim 1, wherein the cord is a telephone cord.

3. The storage assembly of claim 2, wherein the telephone cord has a connector mounted to a free end of the telephone cord.

4. The storage assembly of claim 3, wherein the connector connects the telephone cord to a telephone handset.

5. The storage assembly of claim 1, wherein the material is about forty inches long and the reel is configured such that the reel is rotated about nine and a half revolutions to take up the material.

6. The storage assembly of claim 1, wherein the latch mechanism is movable relative to the reel, the latch mechanism being selectively operable to latch the reel such that the reel is prevented from moving in a retraction direction for winding the material onto the reel.

7. The storage assembly of claim 1, wherein the predetermined length of the material for moving the pilot mechanism between the first and the second positions is about eighteen inches.

8. The storage assembly of claim 1 further comprising a retraction mechanism which operates to cause the reel to move in a retraction direction for winding the length of material onto the reel.

9. The storage assembly of claim 8, wherein the retraction mechanism comprises a spring.

10. The storage assembly of claim 1 further comprising a mounting plate, which is movable relative to the reel, and which supports the latch mechanism and the pilot mechanism.

11. The storage assembly of claim 1 further comprising a housing, the housing having a cavity for storing the reel, the latch mechanism, and the pilot mechanism, and the reel rotatably disposed in the cavity to wind and unwind the length of material.

12. The storage assembly of claim 10 further comprising a housing, the housing having a cavity for storing the reel, the mounting plate, the latch mechanism, and the pilot mechanism, the reel being rotatably disposed in the cavity to wind and unwind the length of material, and the mounting plate being mounted to the housing.

13. The storage assembly of claim 1, wherein the pilot mechanism comprises a lever, the lever being movable between a first position and a second position, wherein when the lever is in the first position, the lever prevents the latch mechanism from operating, and wherein when the lever is in the second position, the lever allows the latch mechanism to operate to selectively latch the reel.

14. A storage assembly for storing a length of cord, the storage assembly comprising:
 a reel rotatable about a transverse axis;
 a direction sensor operably arranged with the reel, the direction sensor operable to latch the reel such that the reel is prevented from moving in a retraction direction for winding the material onto the reel; and
 a lever operably engageable with the direction sensor, the lever movable between an engaged and a disengaged position, wherein when the lever is in the engaged position, the lever prevents the direction sensor from operating to latch the reel, and wherein when the lever is in the disengaged position, the direction sensor is free to operate to latch the reel, the lever being automatically placed in the engaged position over a desired range of lengths of material extending from the reel, wherein the desired range of lengths is between the cord being fully wound onto the reel and the material extending a predetermined length from the reel.

15. The storage assembly of claim 14, wherein the predetermined length is about eighteen inches from the reel.

16. The storage assembly of claim 14, wherein the lever is automatically placed in the engaged position over a second desired range of lengths of material extending from the reel.

17. A storage assembly for storing a length of cord comprising:
 a housing having a cavity;
 a reel disposed in the cavity of the housing and rotatable about a transverse axis;
 a plate mounted to the housing;
 a latch mechanism mounted to the plate, the latch mechanism selectively operable to latch the reel such that the reel is prevented from moving in a retraction direction for winding the material onto the reel; and
 a pilot mechanism mounted to the plate, the pilot mechanism operably engageable with the latch mechanism to prevent the latch mechanism from operating.

18. A storage assembly for storing a length of material comprising:
 a reel rotatable to wind and unwind the length of material;
 means for selectively latching the reel such that the reel is prevented from moving in a retraction direction for winding the material onto the reel;
 prevention means for preventing the latch mechanism from operating over a predetermined range of lengths of material extending from the reel, wherein the range of lengths comprises the material being fully wound onto the reel; and
 means for indexing the prevention means to incrementally move the prevention means.

19. A method for selectively latching a length of cord, the material being wound onto a reel, the method comprising the steps of:
 providing a latch mechanism;
 providing a pilot mechanism;
 engaging the pilot mechanism with the latch mechanism to prevent the operation of the latch mechanism over a predetermined range of travel of the length of material from the reel; and
 extending the material to a length greater than the predetermined length to disengage the pilot mechanism from the latch mechanism to allow the latch mechanism to operate.

20. The method of claim 19, the method further comprising the steps of:
 providing a retraction mechanism which operates to rotate the reel in a retraction direction for winding the cord onto the reel; and
 releasing the material after extending the material to a length greater than the predetermined length.

21. The method of claim 20 further comprising the steps of:
 extending the material a sufficient amount to disengage the latch mechanism; and
 releasing the material to allow the retraction mechanism to rotate the reel in the retraction direction to take up the material onto the reel.

22. A storage assembly for storing a length of material comprising:
 a reel rotatable to wind and unwind the length of material, wherein the reel includes an internal gear portion;
 a latch mechanism, wherein the latch mechanism comprises a direction sensor operably arranged with a gear wheel, the direction sensor and the gear wheel being operably arranged to engage each other such that the direction sensor is engageable with the internal gear portion of the reel to achieve latching of the reel; and
 a pilot mechanism operably engageable with the latch mechanism, the pilot mechanism movable between a first and a second position, wherein in the first position the pilot mechanism prohibits the functioning of the latch mechanism, and wherein in the second position the latch mechanism is operable.

23. The storage assembly of claim 22, wherein the latch mechanism further comprises a spring, the spring operably arranged with the direction sensor to bias the direction sensor toward the internal gear portion.

24. The storage assembly of claim 22 further comprising a gear catch, the gear catch being operably arranged with the gear wheel to permit the gear wheel to incrementally move between a first position and a second position, wherein when the gear wheel is in the first position, the direction sensor can engage the internal gear portion of the reel to latch the reel, and wherein when the gear wheel is in the second position, the reel is free to rotate with respect to the latch mechanism in a retraction direction for winding the material onto the reel.

25. The storage assembly of claim 24 further comprising a mounting plate, which is movable relative to the reel and which supports the latch mechanism and the pilot mechanism, the gear catch integral with the mounting plate.

26. The storage assembly of claim 22, wherein the reel includes a dead zone, the dead zone being configured such that the direction sensor of the latch mechanism is aligned with the dead zone when the material is fully extended from the reel.

27. A storage assembly for storing a length of material comprising:

a reel rotatable to wind and unwind the length of material;

a latch mechanism;

a pilot mechanism operably engageable with the latch mechanism, the pilot mechanism movable between a first and a second position, wherein in the first position the pilot mechanism prohibits the functioning of the latch mechanism, and wherein in the second position the latch mechanism is operable, wherein the pilot mechanism comprises a lever, the lever being movable between a first position and a second position, wherein when the lever is in the first position, the lever prevents the latch mechanism from operating, and wherein when the lever is in the second position, the lever allows the latch mechanism to operate to selectively latch the reel; and a lever spring arranged to bias the lever toward the first position.

28. The storage assembly of claim 27, wherein the lever of the pilot mechanism includes a notch, and wherein the latch mechanism comprises a direction sensor including a seat, the notch and the seat arranged to contact each other when the lever is in the first position such that the direction sensor is in an inhibited position wherein the latch mechanism is prevented from latching the reel.

29. The storage assembly of claim 27, wherein the pilot mechanism further comprises a rotationally movable cam wheel, the lever and the cam wheel being operably arranged to engage each other such that when the cam wheel is rotated a predetermined amount, the lever moves between the first and the second positions.

30. The storage assembly of claim 29, wherein the cam wheel includes a cam lobe having a minor diameter and a major diameter, and wherein the lever includes a cam follower, the cam follower being in contact with the cam lobe, wherein when the cam follower contacts the minor diameter, the lever is in the first position, and wherein when the cam follower contacts the major diameter, the lever is in the second position.

31. The storage assembly of claim 29, wherein the reel includes a wall having a rim with a driver, the driver and the cam wheel being operably arranged to contact each other during rotation of the reel, which causes the cam wheel to rotate.

32. The storage assembly of claim 29, further comprising a cam catch, the cam catch operably arranged with the cam wheel to permit the cam wheel to incrementally rotate a portion of the predetermined amount.

33. The storage assembly of claim 32 further comprising a mounting plate, which is movable relative to the reel and which supports the latch mechanism and the pilot mechanism, the cam catch being integral with the mounting plate.

34. The storage assembly of claim 29, wherein the cam wheel includes an attitude indicator.

* * * * *